United States Patent [19]

Adler

[11] Patent Number: 4,509,835

[45] Date of Patent: Apr. 9, 1985

[54] THREE DIMENSIONAL CINEMA AND NOVEL PROJECTOR SYSTEM THEREFORE

[76] Inventor: Clarence E. Adler, 2809 Algonquin Pkwy., Toledo, Ohio 43606

[21] Appl. No.: 529,223

[22] Filed: Sep. 6, 1983

[51] Int. Cl.³ ............................................. G03B 21/32
[52] U.S. Cl. ...................................... 352/43; 352/69; 352/86
[58] Field of Search ........................ 352/43, 86, 69, 70, 352/58, 81; 350/125

[56] References Cited

U.S. PATENT DOCUMENTS

| 1,419,901 | 6/1922 | Lehnhoff-Wyld | 352/86 |
| 3,501,230 | 3/1970 | Johnston | 352/43 |
| 4,185,898 | 1/1980 | Seitz | 352/69 |
| 4,348,187 | 9/1982 | Dotsko | 352/86 |

FOREIGN PATENT DOCUMENTS

| 529932 | 8/1957 | Belgium | 352/86 |
| 714614 | 11/1931 | France | 352/86 |

Primary Examiner—Monroe H. Hayes
Attorney, Agent, or Firm—Paul F. Stutz

[57] ABSTRACT

Three dimensional viewing achieved through use of multiple lens camera with included erector lens which yield a multiplicity of side by side medium-carried-images with provisions for some overlap and subsequent projection of said images by means of a plurality of spaced parabolic mirror reflectors on opposite sides of a diffusion screen, said reflectors being optically focused and mutually arranged to yield an ultimate, reflected, virtual image of three dimensional character over a relatively wide viewing range occupied by a plurality of viewers. System adapted for home television or commercial movie (cinema) projection.

17 Claims, 11 Drawing Figures

THREE DIMENSIONAL CINEMA AND NOVEL PROJECTOR SYSTEM THEREFORE

Three dimensional or free viewing imagery dates back in time to at least the use of stereoscopes. In the use of these stereoscopes, two separate pictures of the same scene were taken from pre-determined angles. The developed film was printed and mounted in side by side frames movable to and from a connected binocular like device to bring the prints into dimensional focus whereby the person viewing through the binocular element saw a three dimensional image of the object or objects photographed.

Three dimensional photographs have also been made featuring multiple layered film bearing different exposures in each layer which with the use of special glasses, achieve a three-dimensional effect as to the person wearing the glasses.

Movies have also been made by mounting multiple images in super imposition on the screen and being relatively obscured unless viewed through nose mounted eye glasses of special optical effects or color, which translated the images on the screen into a pseudo three dimensional effect. More recently, three dimensional effect images have been transmitted onto television tubes but still requiring special glasses.

In accordance with the present invention, there is provided a truly realistic three dimensional imagery which can be perceived by more than one person spaced from the viewing screen which in actuality is a reflecting mirror; all without special glasses or intervening lenses or optical treatment of the image.

The present invention is seen as residing principally in a unique projector arrangement terminating in a viewing screen or mirror but at the same time requires a film-carried image, or in fact, a plurality of images, of particular character which depends upon a special technique in the taking of the initial picture so as to permit achievement of the desired three dimensional image or images.

It is an object of the present invention to provide three dimensional viewing of a pre-selected object scene at a distance or time remote from the object scene through the medium of a television or cinema.

It is also an object of the present invention to provide three dimensional viewing of a pre-selected defined moving scene but at a time and/or place remote from the defined moving scene.

It is an object of the present invention to provide a system creating a plurality of images of a defined moving scene and cooperating projection system for projecting said images in a unique and novel fashion as ultimately results in a reflected image or images which in juxtaposition yield to the viewer, a three dimensional moving scene of the original defined scene.

It is still another object of the present invention to provide a system of creating images, or electronic impressions convertible into images, and a cooperating system of projection, which translates said images or impressions on a medium, to a laterally defined area, or any viewer located therein, a three dimensional view of the original scene of which the images are photographs thereof.

It is a further object of the present invention to provide a television projection system uniquely adaptable for home viewing and permits a reasonable number of laterally seated viewers to view a projected virtual image in three dimension.

It is still another object of the present invention to provide a novel and unique projected system inclusive of multiple reflectors.

It is a significant object of the present invention to provide a unique projector system which simultaneously projects or translates moving two dimensional images projected into or carried on a television viewing tube, in accordance with a particular embodiment of the present inventon via a pair of horizontally linear but vertically parabolic reflecting means spaced equally focally from a planar vertically diffusing transparent optical means which yields, in concert, on the outermost parabolic means, an image which is virtual and three dimensional.

A futher object of this invention is to provide a method of projection in which a series of horizontally spaced views are integrated into a single picture by means of optically restricting viewing, of each view, to that vertical strip which is appropriate and consistent with the angle of viewing. Thus, normal eye spacing results in stereo viewing. Perception of spatially is enhanced by changing alignment of objects, within the scene, when the viewer moves laterally. This phenomenon also permits viewing around close-up objects, as in a hologram.

It is a further object of the present invention to provide a method of capturing on a medium, image or optical and/or electronic impressions which are translatable into images, either photographically or electronically, and which images are capable of being translated via projection by means of reflectors to ultimate parabolic-mirror-carried virtual images, seen by a viewer spaced therefrom over a reasonable range laterally, as three dimensional.

The foregoing, and as well, other objects of the present invention will become apparent to those skilled in the art from the following detailed description, taken in conjunction with the annexed sheets of drawings on which there are presented, for purposes of illustration only, several preferred embodiments of the present invention.

Considered most simplistically; the present invention is seen as an improvement in the art of cinematography, inclusive of regular film and/or television, by which the phenomena of three dimension is accomplished without the need for the viewer to wear special effect glasses or other optic aids and more importantly is realizable over a relatively generous viewing area and thereby enjoyable by a plurality of viewers at the same time.

The system or technique envisions several departures from the presently known art of taking pictures on a film or other electronic medium (tape or disc) and, interdependent and, interrelated therewith; a totally new, novel and unique system of projection of the images carried on the medium, eg. film, tape or disc, as yield an ultimate, virtual image which is cinematic and at the same time, three dimensional.

The first departure from conventional cinematography resides in the use of multiple cameras in horizontal overlapping or a multiple apertured camera providing a film or medium containing adjacent images in overlapping array. Collaterably, it is most desirable that approximately one half (½) of the cameras or of the multiple lenses are offset vertically so that there are created not only inverted images, but two separate rows of images and further that the spacing provides for overlap.

The second departure is the use of an erector lens or equilavent electronic manipulation such that all of the multiple, sequential images are individually rotated 180° before fixation on the particular medium, eg. film, tape or disc.

By reason of the 180° rotation, the images as carried on the medium are oriented the same as the objects photographed rather than inverted as in conventional cinematography.

The projection of the medium-carried images requires a special projecting system as will be described in more detail hereinafter in conjunction with the drawings. Initially, it is necessary that the medium (film) be reversed or flipped top to bottom following which the projection or transportating of the light rays, as delineated by the images carried on the medium, is to a first parabolic mirror of horizontally cylindrical configuration serving to compress and/or focus the rays or light path to a given focal distance, wherein is situated a lenticular transparent screen which diffuses and expands the light rays vertically and from which they pass to a second parabolic focusing mirror of horizontally cylindrical configuration; the second parabolic focusing mirror having an optical focus region comprising a generally horizontally area which is quite generous and within which viewers facing the second mirror, see a virtual image which is three dimensional and represents an integrated composite of the object, images or scene as captured on the medium, eg. film, tape or disc, by the novel modified cinematographic technique described earlier.

Reference may now be had to the above identified drawings in more detail, wherein the reference numerals in the several figures will identify the same and/or an equilavent element, part, item or component as in other figures.

Figures 1, 2:
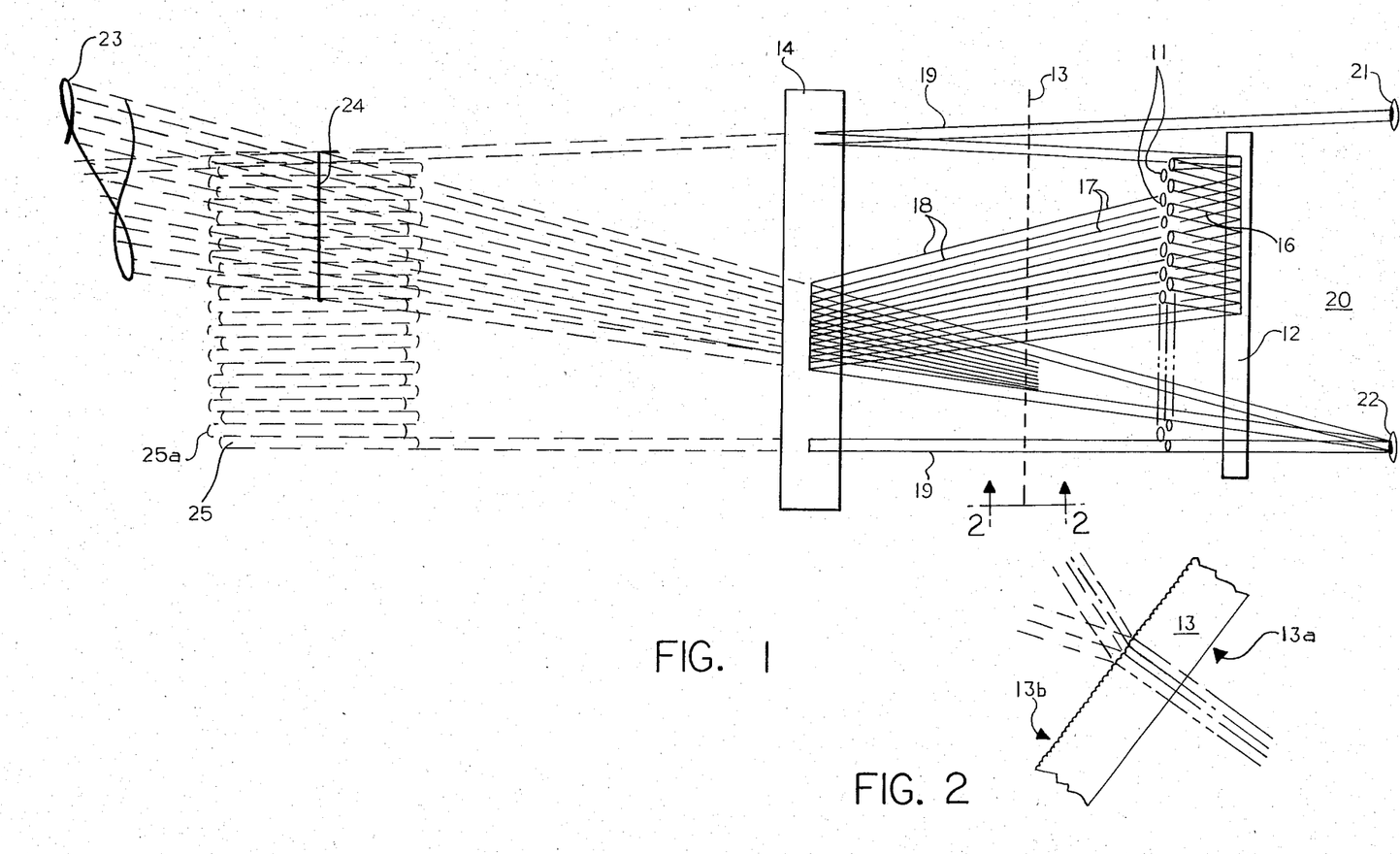
FIG. 1 is an overall top plan view of the physical or structural system of projection in accordance with the present invention.
FIG. 2 is a side elevation view taken on the line 2—2 in FIG. 1.

Referring now to FIG. 1, reference numeral 11 identifies a plurality of projector lenses in closely spaced, alternately offset, horizontal array and spaced from the parabolic focusing mirror 12 of cylindrical configuration and disposed in horizontal relationship with respect to the array of projector lenses. The latter are generally, in aggregate not quite co-extensive with the length of the cylindrical parabolic mirror 12. Not all of the projector lenses are shown thereby eliminating some detail otherwise obscuring clarity of the illustration. The dotted line designates a planar, generally rectangular, lenticular screen which is transparent and usually formed of glass. As can be seen in FIG. 2, one surface 13a of the planar lenticular screen 13 is smooth while the opposite surface 13b comprises a plurality of small horizontal cylinder lenses formed thereon which serve to disperse light paths passing from the smooth side 13c to the horizontally oriented cylindrical lenses 13b so that the light paths are dispersed in a vertical direction only. Horizontally, the projected light paths pass through the screen 13 in parallel relationship.

Reference numeral 14 identifies a second parabolic mirror which is somewhat larger than the parabolic mirror 13 and is spaced on the opposite side of the lenticular screen 13 the same distance as to the parabolic mirror 12. Each of the parabolic mirrors 12 and 14 have equal axial focal lengths and the focal point of each mirror 12 and 14 is located as a central point on the lenticular screen 13. Desirably the parabolic mirrors 12 and 14 are oriented symetrically about the lenticular screen 13. As thus far described, it can be seen that the projected images proceed from the projector lenses 11 to impinge on the first parabolic mirror 12, along light paths 16 and thence on paths 17 through the lenticular screen 13 and continuing in vertically expanded paths 18 to project and impinge on the second cylindrical parabolic mirror 14 and thence on light path 19 to the region 20 represented by spaced eyes shown schematically and identified by the reference numerals 21 and 22. By way of illustration, the space between the eyes 21 and 22, in practice represent a distance which can accomodate a plurality of viewers depending on the horizontal extent of the array of projector lenses. The light path lines identified by the reference numeral 19 are shown only at the lateral extremities allbeit they exist the entire extent of the parabolic mirror 14 but to show all of them would obscure the drawings.

While explained in more detail hereinafter, it may be preliminarily noted that, the script letter "L" identified by the reference numeral 23 is projected from the midpoint 24 of a plurality of side by side zones 25 and 25a in alternate relationship and representing the zones projected through the individual offset array of projector lenses 11 as described hereinabove.

Figure 3:
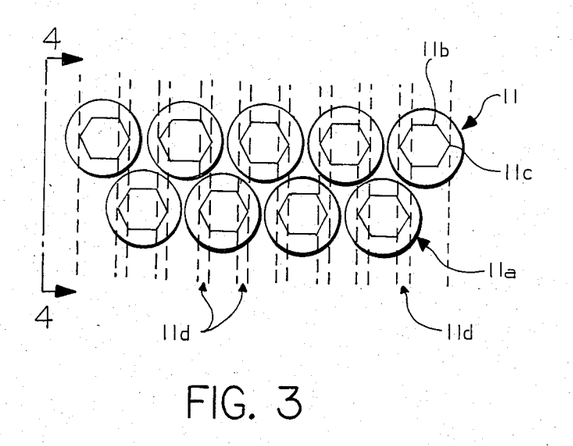
FIG. 3 is a head-on view of an array of projector lenses schematically illustrated in appropriate relationship in accordance with the present invention.
Figure 4:
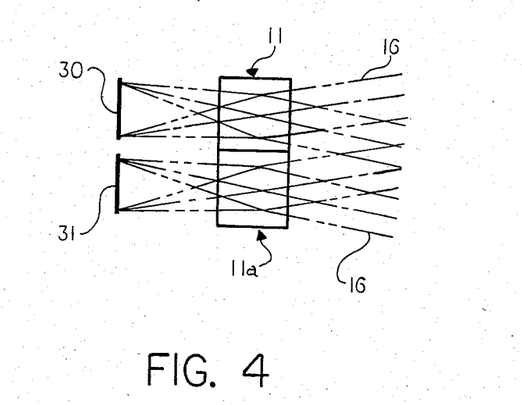
FIG. 4 is a side elevation view taken on the line 4—4 in FIG. 3.

FIGS. 3 and 4 schematically illustrate a plurality of projector lenses 11 in horizontal array and with alternate lenses in vertically offset relationship in accordance with the present invention. For purposes of identification the lower set of lenses are identified by the reference numeral 11a. The lens openings 11b (FIG. 3) as can be seen, are hexagonal and located so that the apex 11c, of each, which resides or coincides with the central horizontal axis, provides an overlap as between the upper and lower set and therefore an overlap in the region between the dotted lines identified by the reference numeral 11d. The provisions for overlap as described, avoid any blanks, or lines, between images as projected via a given lens. Thus providing an effective, constant aperture width across the entire lens array. The lenses 11 are selected to have a focus of infinity and do project the light paths 16. Reference numeral 30 identifies the medium, in this case film, bearing fixed images, which properly illuminated are the source of the light paths proceeding through the upper array of lenses 11 while reference numeral 31 identifies the medium, in this case film, serving under proper illumination for the projection of the film image determined light paths through the lower array of lenses 11a.

Figure 5:
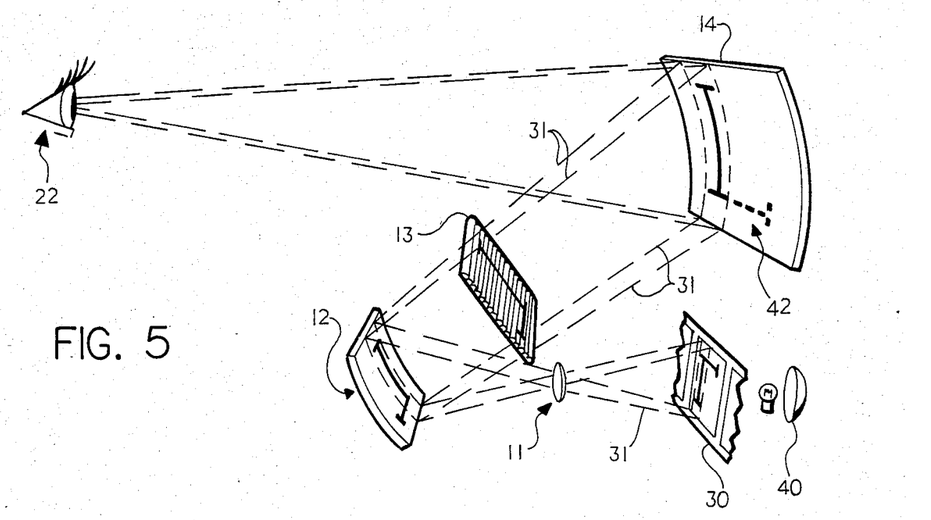
FIG. 5 is a perspective view of the salient structural and/or physical features of projection in accordance with the assembly shown in FIG. 1 but shown schematically for ease of illustration and simplicity of understanding.

FIG. 5 serves to illustrate, in perspective and schematically, and to assist understanding the projection of the light paths determined by the illuminated image on one frame of film in the projection system of the invention and as illustrated, generally, in FIG. 1. Shown is the image of an upper case capital "L", inverted on the film medium 30. A portion as defined by dotted line 31, of this letter "L" is projected by reason of illumination source 40 through the single projector lens 11 to impinge on the first parabolic mirror reflector 12 which reflects the light paths through the lenticular screen 13 onto the second larger parabolic mirror 14 and thence to the viewers eye 22. In this illustration, as shown, the viewer will see only the vertical leg of the letter "L" as delineated by the light path lines 31 and he will not see the lower horizontal leg as shown in dotted outline, in the parabolic, cylindrical mirror 14, identified by the reference numeral 42. It should be appreciated that the parabolic mirrors 12 and 14 in FIG. 5 are only segments of the full extent thereof shown in FIG. 1 and the same applies to the lenticular screen 13; all in order to illustrate a singular rather than composite projection for the purposes of aiding in the understanding of the present invention.

It can be further seen that the viewer sees (or would see) the letter "L" in its proper, upright, orientation as a reflected image projected from an inverted letter "L", as on the film frame of the film strip 30. It should be understood, from prior and subsequent description herein, that the film 30 as originally produced, capturing the image of the actual letter "L" was initially inverted by use of an erector lens and that, secondly, the film medium, or strip, was inverted to the position shown as at 30 in FIG. 5 in order that the viewer, at 22, could see the proper, spatially accurate, letter "L".

It should be further appreciated that the light paths defined, or referred to by the reference numerals 31 in FIG. 5, are definitive of a singular zone such as that identified by the reference numeral 25, or the reference numeral 25a in FIG. 1. It, of course, follows that the projection of images on film through the other multiplicity of lenses yields the overall object scene.

In FIG. 5, the letter "L", as seen by the eye 22, is shown as existing on the surface of the final parabolic viewing mirror 14. It is to be understood, of course, that one viewing a mirror actually sees a virtual image, or images, and that the virtual image viewed in the mirror is actually a distance equal to the distance of the object to the mirror. This concept, as applied to FIG. 5, means that the capital "L" (in mirror 14) is, in fact, a virtual image, as created in the lens 11 and is, in fact, to the rear of the parabolic mirror, a distance equal to that measured from the mirror 14 to the parabolic mirror 12 and thence to the lens 11.

Figure 6:
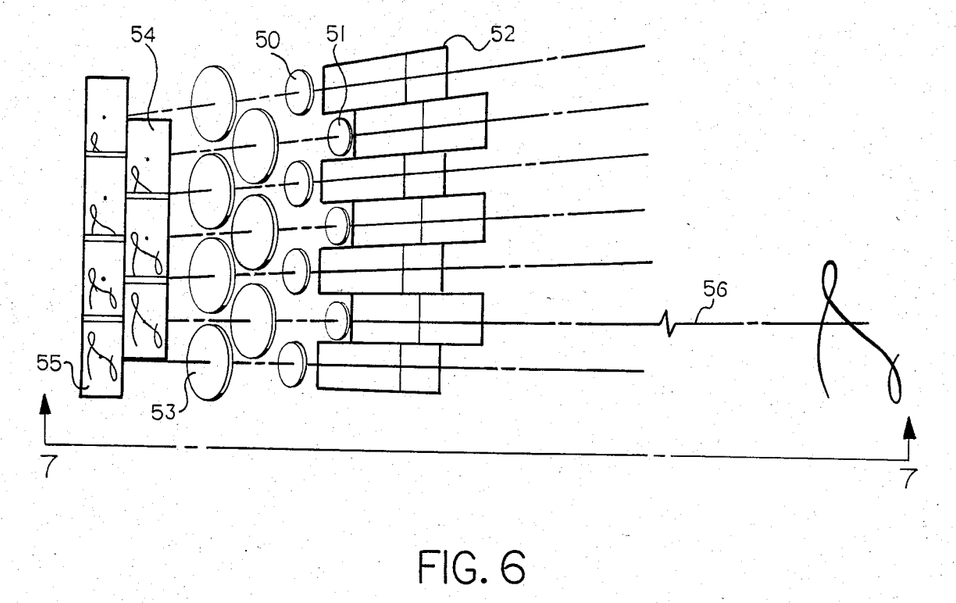
FIG. 6 is a schematic illustration of an interdependent embodiment of the present invention and illustrating the production of medium-carried dual images from a single object consisting of the script, capital letter "L"; said medium (film) being projected in accordance with the present invention to yield three dimensional images.
Figure 7:
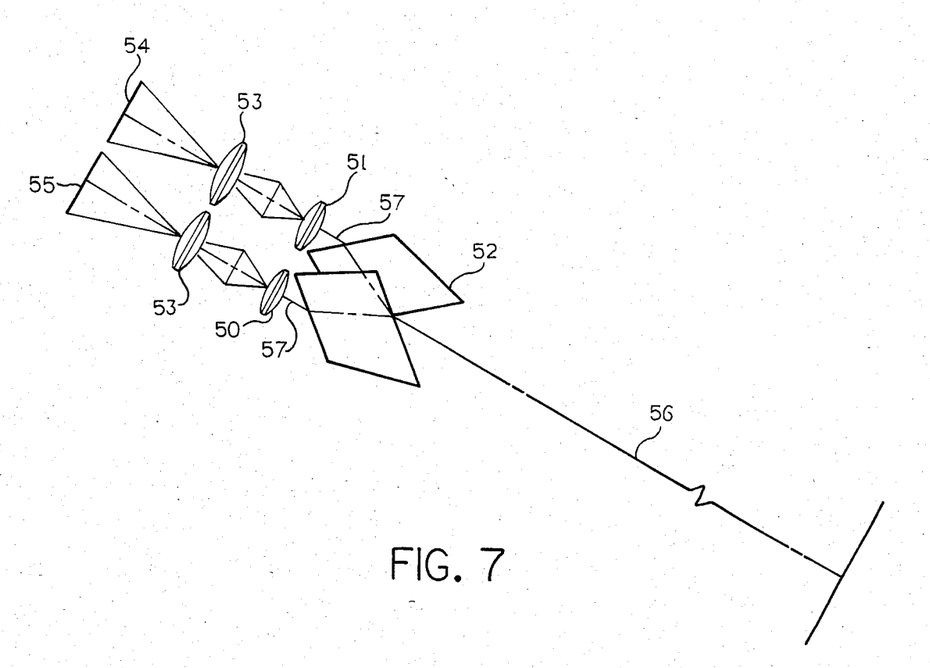
FIG. 7 is a side elevation, single-line representation of the array shown in FIG. 6 and taken generally on the line 7—7.

Reference may now be had to the FIG. 6 and FIG. 7, for an illustration of one manner of optically producing a medium, in this case film, of a photographed object, in this script letter "L", employing multiple cameras, or a camera with multiple lenses. In FIG. 6, reference numeral 50 represents a lower, horizontal array of camera lenses, while reference numeral 51 identifies an upper, offset array of camera lenses. Reference numeral 52 identifies a plurality of offset prisms, while reference numeral 53 identifies a corresponding number of erector lenses. Reference numeral 54 identifies the film frames produced by the upper set of camera lenses 51, while reference numeral 55 identifies the film frames produced by the lower array of lenses 50. The capital letter "L" in script form, properly illuminated emanates a single light path 56 which proceeds (see interrupted line) to the offset prism 52 wherein there is created two identical light paths 57 which proceed, respectively, through the upper array of lens 51 and lower array of lens 50 thence through the array of erector lens 53 to impinge on the film medium frames 54 and 55 producing the images of the script letter "L" essentially as shown. It can be seen, of course, that some of the lenses will not receive light paths of the complete letter "L". At the same time, by use of the erector lens, in accordance with an embodiment of the present invention, the images on the film, or medium, are oriented the same as the actual script letter "L" as photographed rather than inverted, as in conventional cinematography.

By way in interlineation, it should be appreciated that in FIG. 6 and FIG. 7, and elsewhere in this description, film strips and frames (see reference numerals 54 and 55) are illustrated as the medium upon which the image is fixed. It will, however, be understood that the image or images as preceived by a multiple lens camera or an array of individual cameras, particularly in the case of television cameras, may be fixed electronically upon a pre-selected and desirable medium such as tape or disc. It will be also understood that the images may be electronically reversed before fixation in the same manner as accomplished optically by the use of the erector lens 53 as illustrated in FIG. 6 and FIG. 7.

Figure 8:
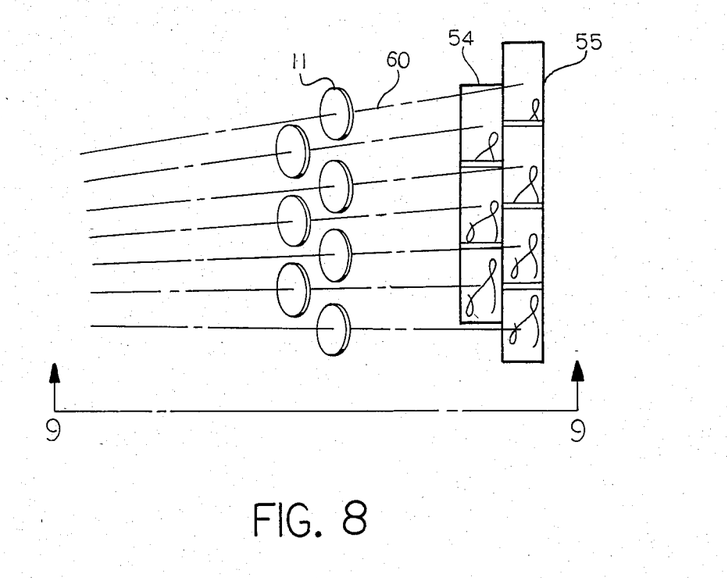
FIG. 8 is a top-plan view illustrating a schematic projection of multiple images in accordance with a particular embodiment of the present invention.
Figure 9:
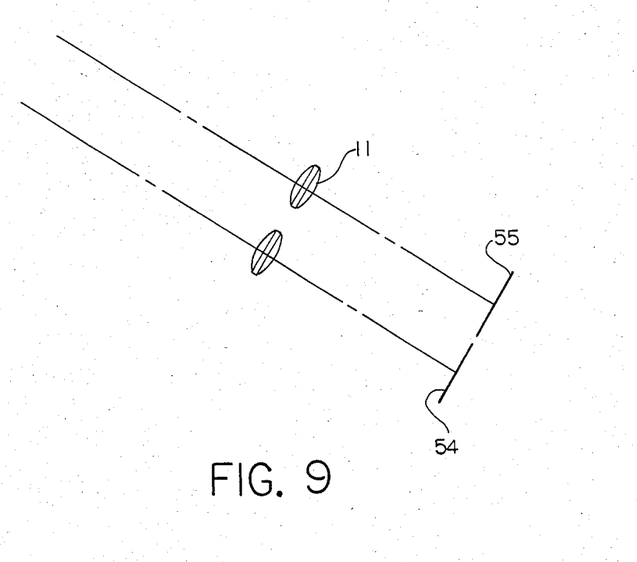
FIG. 9 is a side elevation, particularly in section, single line drawing taken on the line 9—9 of FIG. 8.

Reference may now be had to FIG. 8 and FIG. 9 for an explanation and illustration of the manner of projecting the images fixed on the film frames 54 and 55 of FIGS. 6 and 7. First of all, by reference to FIG. 8 the film frames 54 and 55 have individually been reversed. Thus the script letter "L" in FIG. 8 is of reverse orientation to the actual letter "L" whereas as initially fixed, the letter "L" as shown in FIG. 6 have the same orientation. It is, of course, necessary, in accordance with the present invention, that the individual frames be optically reversed for the reasons set forth in the earlier description of FIG. 5. Reference to FIG. 5 which illustrates the projection system in accordance with the present invention illustrates the letter "L" on the medium or film 30 as reversed or inverted in order that the viewer at eye 22 could see the letter "L" in its proper orientation by reason of the reflectance, via the parabolic mirrors 12 and 14.

Thus in FIG. 8 the film medium has the object letters inverted and the properly illuminated images pass via light paths 60 through the offset array of projector lenses 11.

It will be understood that the light paths proceeding beyond the projector lenses 11 will impinge upon an appropriate horizontally cylindrical parabolic mirror thence through a lenticular screen to a final, horizontally cylindrical parabolic viewing mirror as described and set forth in FIG. 1 and FIG. 5; such that a plurality of viewers in a region 20 (FIG. 1) will see the composite of singular virtual images which will be three dimensional even if the viewer moves his head forwardly or rearwardly or to the left and/or to the right and/or virtually up and/or down.

Figure 10:
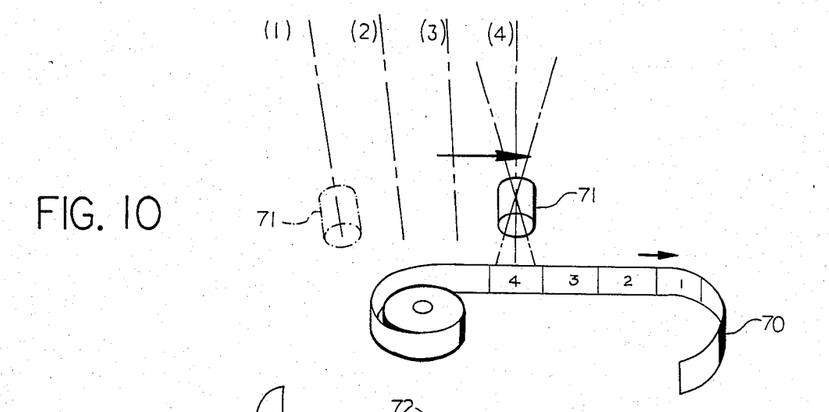
FIG. 10 is a schematic perspective view of a photographic reproduction of a scene onto a film to illustrate a basic embodiment and principal forming a basis of the present invention.
Figure 11:
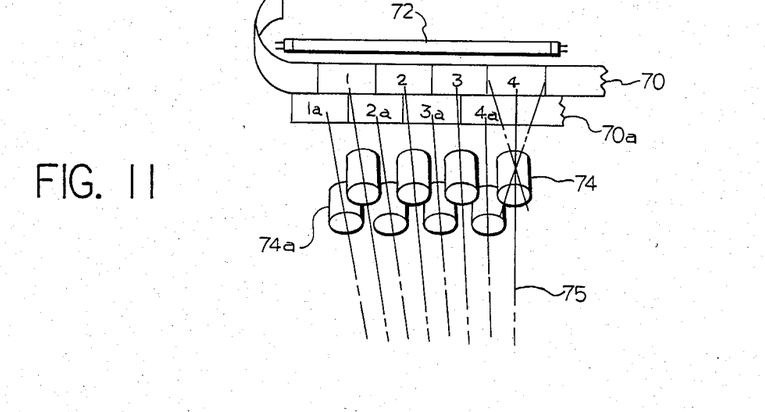
FIG. 11 is, like FIG. 10, a perspective view, but showing projection, in perspective schematic, to illustrate the same principal and basic embodiment of FIG. 10.

Reference may now be had to FIG. 10 and FIG. 11 wherein there is schematically illustrated a simplified non-cinematic technique for establishing feasibility of the present invention. In FIG. 10 a camera (not shown) is moved sequentially, in the direction indicated by the arrow, from position (1) to position (2) to position (3) to position (4). At each rest position a single picture is taken with the resultant exposed frames present, the strip of film 70 and being correspondingly identified as frames 1, 2, 3, and 4.

To project the captured or fixed images, the film strip 70 is reversed from the position shown in FIG. 10 to the position of FIG. 11 and illuminated from behind, by suitable light source 72. The frames are then projected simultaneously through a bank of four (4) projecting lenses 74. Previously in keeping with the techniques of the present invention, a duplicate 70a of the film strip 70 is made and including frames 1a, 2a, 3a and 4a corresponding to the frames of strip 70. As can be seen, the film strip 70a is located in appropriate offset relationship with strip 70 and the images thereon projected through a horizontal array of projection lenses 70a vertically offset with respect to the lenses 74 to yield light paths 75 which are then projected through the projector system (not shown) of the present invention consisting of the pair of parabolic mirrors having, in between, the lenticular screen for expanding light paths yielding an ultimate virtual image in the final parabolic lens which is three dimensional. Thus a viewer observing the final parabolic mirror image sees the scene photographed by the camera in the sequential positions of FIG. 10 in three dimension. The projection system according to the present invention thereby yields a scene in which the items or objects are seen in true spatial relationship with each other regardless of horizontal or vertical movement of the head of the viewer over a generously extensive viewing area.

While it is not intended to be bound by any theory it is believed that the inventive techniques as herein described, are effective in producing integrated, three dimensional images by reason of the interrelationship of the principal features of the modified cinematography as disclosed herein and the unique and novel features of the projection system as outlined herein and that the features and techniques disclosed herein are disclosed individually and in combined form for the first time in the present specification.

Firstly, it is important that the particular scene be photographed by either a plurality of cameras or a camera having a plurality of apertures arranged in horizontal, alternately vertically-offset relationship and with their effective range or scope providing overlap with respect to the next adjacent but vertically offset lens.

Secondly, it is necessary that the light paths or images as seen by the camera lens (film or television) be reversed by an appropriate erector lens or electronically prior to fixation on the particualr medium of the film, tape or disc.

It is additionally necessary that the medium, be it film, tape or disc, be reversed so that the projected light paths or images are reflected through the projector system and to the eyes of the viewer in proper orientation.

It is imperative that the principal elements of the projection system be in mutually parallel relationship and preferably horizontally disposed with respect to the surface of the earth or of the particualr scene being photographed. In this context, the array of projector lenses might be horizontal and while the cylindrical parabolic mirrors are curvilinear in the vertical, they are flat in the same horizontal sense as the array projector lenses. Similarly, the diffusion screen must be arranged with the axis of the elongate lenticular (small cylinders), on the one side, in parallel, horizontal relationship with the array of lenses and the linear axis of the parabolic cylinders. With this horizontal relationship arrangement of the principal components of the projector system, it is clear that the light paths projected from the projector lenses are collimated with respect to each other and remain horizontally collimated. As a consequence, the ultimate virtual image reflected from the final horizontally cylindrical but parabolic mirror, is defined by light paths which are collimated both horizontally and vertically.

Now considered in a vertical sense, the light paths in collimated relationship, projecting from the bank of the projector lenses 11, are initially focused in the vertical plane by their reflection from the first parabolic horizontally disposed cylindrical mirror 12. Thence the light paths, in subsequently passing through the diffusion lenticular screen, are expanded solely vertically (not horizontally) to yield the virtual image seen in the final parabolic mirror, the latter serving to vertically collimate the light paths into parallel relationship as reflected therefrom.

It is important that proper focus be maintained by having the parabolic mirrors 12 and 14 in relative optic orientation symetrically about the lenticular screen 13.

A particular function of the lenticular screen 13 is to extend the allowable vertical variance at the range 20 (FIG. 1). By way of explanation, without the lenticular screen, the same scene would be seen in the range area 20 (FIG 1); but only at a fixed vertical position. Any vertical movement of the individual viewer would cause the scene to disappear. The lenticular screen with its vertical expansion diffusion allows the scene in three dimensional form to be seen allbeit the viewers head may move vertically.

The projection technique as described herein yields contiguous vertical zones 25 and 25a corresponding to the number of lenses and which in composite or in integrated form reconstruct the scene photographed as viewed from any given angle of the given lens in taking the corresponding initial photograph.

It is important in this system in accordance with the present invention that the projection lenses are focused at infinity. As a consequence, no real image is ever formed. Rather the light rays are collimated and it is accordingly possible to overlap contiguous lens apertures without producing any ambiguity or discontinuity as the viewer moves laterally.

The description of the present invention hereinabove has been concentrated principally on its application with respect to film as the medium upon which the reversed images are fixed. As indicated earlier herein, however, it will be appreciated that the principals of the present invention are fully utilizable in the field and the art of television. It follows that the particular manipulations set forth herein as necessary in the accomplishment of the present invention and in the handling of the film; may be accomplished electronically by the use of appropriate circuitry as well understood in the television and associated arts.

First of all, in the use of television; television cameras would be used instead of movie cameras or in the alternative, a television camera featuring a multiplicity of apertures, would be used and the apertures would be in horizontal array to yield the same pattern as the array of projectors identified by the reference numeral 11 in FIG. 1. The objects or scene perceived by the television cameras or multi-apertured television camera would be fixed upon a suitable medium such as a tape or disc yielding a tape or disc containing the appropriate signals or arrangement of magnetized particles representing the multiple images or the multiple views of the images or objects seen by the individual horizontal array of apertures or cameras.

Next, the projection of the images contained on the medium would be accomplished by producing the multiple images on the face plate of a television tube which in turn would be projected through the projector arrangement or system as described herein. Alternately, individual tapes or discs, each contain the appropriate signal, corresponding to the images perceived of the scene as photographed by a given individual television camera, would be projected onto its own television screen and thence projected via an individual projector lens, for example, the lens 11 of FIG. 1. Following the same procedure for a plurality of television cameras, or apertures, in a television camera, say 30 to 50 in number, in lateral offset array, my invention similarily envisions the reproduction of the appropriately inverted images on an array of individual very small television tube face plates corresponding in number to the number of cameras or the apertures in multi-apertured camera. Simultaneously, the television tubes in horizontal array, would be located to project the individual face plate images through a corresponding plurality of projector lenses 11 arranged as in FIG. 1. The projector system of the present invention, to wit: the parabolic mirrors and intermediate lenticular screen, would cause the individual images to be combined or integrated into a composite, virtual image reflected from the final, horizontally disposed, parabolic reflecting mirror (such as the parabolic mirror 14 in FIG. 1) which composite, virtual image would be three dimensional.

The embodiment of the present invention employing television as the medium for producing the multiplicity of images by a multiplicity of cameras in horizontal but vertically offset array, is seen, as uniquely adaptable for utilization in a residential setting. Thus, television projection consoles, as furniture, located to project conventional television images onto a large screen located near a wall, for example, are already marketed and located in many homes. Accordingly, there already exists a market, since public acceptance of the projected form of television viewing is established. By projected form of television viewing, I means as described, rather than, or as contrasted with the conventional television set having an integral television tube or face plate bearing the particular television program images as produced by bombarding the phosphores on the rear side with impulses from the electronic gun located in the funnel portion of the tube.

In keeping with the foregoing, it appears that the projection system of the present invention would be particularly adaptable to home use. Certainly, the ultimate image in accordance with the present invention having the advantage of being three dimensional, represents an improvement over the present console type projection television image, which is two dimensional.

While I have discussed several embodiments and have set forth disclosures of understanding, principals and structure insofar as presently known to me, it will be appreciated that I do not intend to be limited to the precise disclosure, drawings and statements of understandings which are set forth as exemplary of the present invention only rather than limitive.

Accordingly, it is clear, that all modifications, changes, substitutions and equilavent procedures and equilavent equipment be suggested to those skilled in the art from a reading of the within specifications and understandings of the present drawings. I intend to therefore include all such modifications, changes, substitutions, equilavent procedures and equivalent equipment within the spirit and scope hereof, unless such changes would do violation to the language of the appended claims.

It is of course, further within the scope of the present invention to employ optics to compress the light paths from lens to the array of parabolic mirrors by employing additional mirrors to fold the light path, in effect, into a smaller total volume thereby permitting use of smaller console units to contain the projector system of this invention.

I claim:

1. A method of creating viewable images as reflected from a mirror, which images are virtual and of three dimensional character which comprises:
   (1) photographing, by suitable camera, a preselected scene but reversing the images as perceived by the camera lens before fixation of the images on a suitable medium;
   (2) manipulating the medium to reverse the images;
   (3) projecting said reversed images on said medium onto a first parabolic reflector; and
   (4) causing the images or light rays reflected from said first parabolic reflector to pass through a light diffusion screen and onto a second parabolic reflector to thereby create the virtual images of three dimensional character.

2. The method as claimed in claim 1, wherein the parabolic reflectors are linear in the horizontal direction and the diffusion screen is a planar lenticular screen with individual lenticules in horizontal relationship and located on the side of the planar lenticular screen closest to the second parabolic reflector.

3. The method as claimed in claim 2 wherein step (1) employs a multiplicity of cameras or lenses in horizontal array and in parallel disposition with the lenticules and the linear parabolic reflectors.

4. The method as claimed in claim 1 wherein step (1) contemplates a multiplicity of cameras in horizontal array.

5. The method as claimed in claim 3 wherein step (1) features a multiplicity of photographic lenses in horizontal array with adjacent lenses in offset overlapping relationship.

6. The method as claimed in claim 1 wherein step (1) is via a television camera and the medium is tape, disc or the like.

7. The method as claimed in claim 1 wherein step (1) is by means of a movie camera and the medium is film.

8. A projector system for projecting images carried on a medium; said images being in horizontal array; said system comprising:
 (1) a horizontal array of projector lenses with adjacent lenses in vertically offset but optically overlapping relationship;
 (2) means for holding said medium in appropriate relationship and disposition and for moving said medium with respect to said lenses;
 (3) light means arranged to transmit light rays through said medium carrying defined images through said lenses;
 (4) a first parabolic reflector arranged to receive said light-ray-carried-images and to reflect same at a predetermined angle with respect to the transmitted rays;
 (5) a light diffusion screen arranged to intercept said first parabolic reflector reflected rays and transmit same therethrough in generally straight line extension of the rays as reflected from the first parabolic reflector; and
 (6) a second parabolic reflector arranged to receive said reflected rays and to reflect same at a predetermined angle with respect to said rays projected by reflector (4) and directed to a viewing region spaced therefrom.

9. A projector system as claimed in claim 8 wherein said parabolic reflector (4) and parabolic reflector (6) are at the same time linear and in mutually parallel relationship and parallel to said array of lenses.

10. A projector system as claimed in claim 9 wherein said diffusion screen is a planar transparent glass-like member of preselected thickness and having one smooth face and on the other face a plurality of lenticule lenses in mutually parallel array, said screen being disposed with the lenticules in parallel relationship with said linear parabolic reflectors or either side and accordingly in parallel relationship with said array of projector lenses.

11. A projector system as claimed in claim 8 wherein elements (2) and (3) comprise a plurality of television tube screens capable of carrying, in each, a plurality of images as carried on said medium.

12. A projector system as claimed in claim 8 wherein said projector lenses are focused optically at infinity.

13. A projector system as claimed in claim 10 wherein said projector lenses are focused optically at infinity.

14. A projector system as claimed in claim 8 wherein the focal point of both parabolic reflectors lies on the light diffusion screen.

15. A projector system as claimed in claim 14 wherein the focal lengths are the same.

16. A projector system as claimed in claim 15 wherein the projected light paths are folded optically to provide a more compact design.

17. A projector system as claimed in claim 15 wherein said projector lenses are optically focused at infinity.

* * * * *